US005507024A

United States Patent [19]

Richards, Jr.

[11] Patent Number: 5,507,024

[45] Date of Patent: Apr. 9, 1996

[54] FM DATA-SYSTEM RADIO RECEIVER

[75] Inventor: Oliver L. Richards, Jr., Grosvenor Dale, Conn.

[73] Assignee: Allegro Microsystems, Inc., Worcester, Mass.

[21] Appl. No.: 245,285

[22] Filed: May 16, 1994

[51] Int. Cl.[6] .......... H04B 1/68

[52] U.S. Cl. .......... 455/260; 455/45; 455/46; 455/202; 381/4

[58] Field of Search .......... 455/42, 45, 46, 455/202, 205, 254, 260, 265, 266; 348/486, 485, 738; 370/110.1; 381/2, 3, 4; 370/74, 76; 375/216

[56] References Cited

U.S. PATENT DOCUMENTS

| | | | |
|---|---|---|---|
| 4,002,991 | 1/1977 | Ogita | 455/202 |
| 5,202,924 | 4/1993 | Richards, Jr. | 381/4 |
| 5,241,687 | 8/1993 | Short | 455/265 |

FOREIGN PATENT DOCUMENTS

| | | | |
|---|---|---|---|
| 0110831 | 5/1988 | Japan | 381/2 |

OTHER PUBLICATIONS

*United States RBDS Standard,* Draft No. 2.0, NRSC Document, Aug. 1, 1992 (pp. 1–4, 6–9, and Bibliography).

*Specifications of the Radio Data System RDS for VHF/FM Sound Broadcasting,* Tech. 3244—E, Mar. 1984, Technical Centre of the European Broadcasting Union, (pp. 1–10, and 59–60).

*Single Chip RDS Demodulator+Filter, TDA7330* (technical sales bulletin) SGS–Thompson Microelectronics, May 1991, (3 pages).

*Modern Digital and Analog Communication Systems,* B. P. Lathi, Holt, Rinehart and Winston, 1983, (pp. 244–247 and References p. 343).

*Primary Examiner*—Reinhard J. Eisenzopf
*Assistant Examiner*—Doris To

[57] ABSTRACT

An FM stereo radio data-system receiver has a front end including an FM discriminator that produces a composite signal composed of an AM stereo signal, including a 19 KHz pilot, and an AM digital-data signal. A dual-bandwidth phase locked loop (PLL) locks onto the pilot and serves both, as the decoder of the stereo portion of the composite signal, and as a generator of a strong stable 38 KHz carrier for use in regenerating the bit rate clock signal and for decoding the data-symbol signal of the digital-data portion of the composite signal. Advantages include economy of circuitry, a simpler and less costly high pass filter, and greater reliability in the decoding of the data signal.

10 Claims, 4 Drawing Sheets

FM DATA-SYSTEM RADIO RECEIVER

BACKGROUND

This invention relates to an FM radio data-system receiver for receiving standard broadcast FM audio and FM digital-data signals, and more particularly to such a receiver that re-generates the suppressed data-signal carrier from the received FM audio pilot carrier.

Such radio data systems are currently in commercial use in Europe but in the United States are only beginning to be used. Technical standards to which Europeans work is entitled Specifications of the Radio Data System RDS for VHF/FM sound Broadcasting, Tech. 3244-E, published March 1994 by Technical Centre of the European Broadcasting Union, Avenue Albert Lancaster 32, B-1180 Bruxelles (Belguim). A second draft of the voluntary technical standard in the United States, being developed by a joint committee of the Electronics Industry Association (EIA) and the National Association of Broadcasters (NAB), is entitled United States RBDS Standard-Draft No. 2.0, NRSC Document; Aug. 1, 1992.

According to both standards, digital-data signals are transmitted as a subcarrier as part of conventional broadcast FM signal. The data is carried on a 57 KHz suppressed carrier double sideband subcarrier that is phase synchronous with the 19 KHz pilot carrier. Thus, the FM carrier is modulated at the transmitter with a standard composite stereo multiplexed signal wherein there is added a radio data signal centered about a 57 KHz suppressed carrier as illustrated in FIG. 1.

In the transmitter, the digital-data is differentially clocked by pilot divided by 16, the clock and data then being differentiated by an impulse modulator and subsequently frequency limited to form a spectrally efficient data-symbol modulation signal. These later steps are a means for coding the digital data in Manchester code whereby the resulting data-symbol modulation signal occupies a bandwidth of 4.8 KHz. The data-symbol modulation signal is then fed to a 57 KHz balanced modulator.

With reference to FIG. 2 herein, data recovery in a receiver of the prior art, proceeds by first retrieving the suppressed 57 KHz data carrier from the standard composite stereo multiplexed signal at conductor 14 and demodulating the 57 KHz+/−2.4 KHz band to retrieve the data-symbol signal, typically using a Costas phase locked loop (PLL) illustrated as circuit block 12. Within PLL 12 is a 57 KHz demodulator 13 and a 57 KHz suppressed carrier recovery circuit 15. The 1187.5 Hz clock signal is obtained by using a bit-rate clock recovery circuit 18 that includes a divider (not shown) for dividing the carrier frequency by 48 and a phase error detector (not shown) to correct for the phase error incurred by the frequency dividing.

Demodulator 13 in the PLL 12 provides reconstruction and recovery of the data-symbol signal that is passed through a low pass filter 19. Decoding of the recovered data-symbol signal for display is achieved by a data-symbol decoder 20, a differential decoder 22 and a data processor 24, all with respect to the recovered bit-rate clock signal. Digital-data signal demodulation and retrieval of the 57 KHz using the Costas phase locked loop, in the prior art receiver, is accomplished by first filtering the composite FM-radio stereo signal including the 57 KHz+/−2 KHz data band through a band pass filter 30 for passing only the 4 KHz wide data band. The passed data band signal is then introduced to the Costas phase locked loop (PLL) 12 serving as a synchronous 57 KHz demodulator.

In the prior art receiver, the 57 KHz data signal demodulator operates to retrieve the 57 KHz carrier from the 57 KHz sidebands and its broad band Costas phase locked loop tends to be unstable under noisy conditions. It is therefore essential that the 57 KHz bandpass filter 30 be capable of strongly rejecting the stereo band signals and signals that may be generated by FM radio signals in adjacent FM radio broadcast bands.

The 57 KHz bandpass filter 30 is also required to have rising and fall-off characteristics that are symmetrical about the suppressed 57 KHz carrier so that the phase shifts it imposes on the two side bands of the 57 KHz data-band signal are the same for rendering recovery of the 57 KHz carrier in the demodulator feasible. These stringent performance requirements for the 57 KHz band pass filter 30 leads to the need for many tight tolerance filter components, and in practice such filters have from eight to twelve poles, and are expensive.

When the radio data-system receiver is combined with an FM stereo radio receiver, the receiver front end (i.e. RF tuner, IF amplifier and FM discriminator) produces the composite multiplex signal at a conductor 14 as shown in FIG. 2. From there on, the data recovery and decoding circuits are independent of the stereo pilot retrieval and stereo decoder circuit 36.

A major commercial interest in such FM radio stereo receivers with digital-data reception capability, has been directed to mobile use in automobiles and other vehicles wherein unlike for fixed receiving stations, the received radio signal is subject to drastic changes in signal strength, multipath distortion, and interference. The data to be received by the driver of a vehicle may include current weather conditions, traffic reports and other data of special interest to a traveler.

It is an object of this invention to provide a radio data system receiver with improved stability and reliability of data reception.

It is a further object of this invention to provide such a radio data system receiver having a data system demodulator employing a phase locked loop with a narrow bandpass, obviating the need for a high performance 57 KHz bandpass filter.

It is yet another object of this invention to provide such a radio data system receiver as part of an FM stereo radio receiver, wherein a single narrow band phase locked loop serves both as the stereo decoder and as the primary circuit for regenerating the 57 KHz suppressed data-carrier.

SUMMARY

An FM radio data-system receiver is of the kind having a radio-receiver front-end circuit means for receiving an FM broadcast audio plus digital-data signal, and for producing at a composite-signal output conductor a composite signal including the audio pilot signal and a standard dual-side-band digital data signal with a suppressed carrier.

A pilot-signal retrieval circuit has an input connected to the composite-signal conductor for generating at a pilot output a relatively noise free pilot signal of the same frequency as, and in phase with, the pilot-signal part of the composite signal. The pilot-signal retrieval circuit is also for generating at a first data-carrier output a first stable signal of frequency that is an exact multiple of the pilot signal and corresponds to the frequency of the suppressed carrier, the first stable signal having a fixed phase relationship with the noise free pilot signal.

A demodulator has a data-carrier input connected to the data-carrier output of the pilot-signal retrieval circuit means, and has a data-signal input connected to the composite-signal conductor for recovering and producing the recovered data-symbol signal from the data-signal portion of the standard composite signal.

A bit-rate clock recovery circuit has a pilot-reference input connected to the pilot output of the pilot-signal retrieval means, and has a data-symbol input connected to the demodulator output, for re-generating the bit-rate clock signal from the data-band portion of the composite signal.

The radio data system receiver preferably includes a single pole high pass filter having a pole at a frequency that is greater than those of the data band in the composite signal. This high pass filter is connected between the composite signal conductor and the data-signal input of the demodulator-means.

The radio data system receiver may further include providing the pilot retrieval circuit an additional capability for generating at a second data-carrier output a second stable signal of frequency that is an exact multiple of the pilot signal and corresponds to the frequency of the suppressed carrier but being 90 degrees out of phase with the first stable signal.

Using this second stable signal, the radio data system receiver may additionally include the following two features in order to render it comparable with both the U.S. and the European standards:

An electrically controllable switch will have a switch pole connected to the reference input of the demodulator. The switch pole will be alternately switchable to the one and the another output from the pilot retrieval circuit.

Furthermore, a phase selector will have an input connected to the input of the bit-rate recovery circuit and will have an output connected to the switch for causing the switch to alternately connect the reference input of the demodulator means to the one and another outputs of the phase locked loop, and choosing for which one of the alternate switch connections the amplitude of the bit symbols in the data-symbol signal is greatest, and holding the switch means connected to the chosen of the switch connections.

The U.S. and European standards for radio broadcast data systems both call for a transmitted FM signal modulated by a narrow data band including dual data side band with a suppressed 57 KHz digital-data carrier wherein the data band has a modulation index less than one eighth that of the stereo pilot signal. This invention recognizes the desirability of using the relatively strong 19 Khz stereo pilot signal for re-generating the 57 Khz data, rather than from the weak data band itself as taught by the prior art, and provides a more stable and more cost efficient means for 57 Khz data carrier re-generation in the receiver. The radio data receiver of this invention preferably employs a dual bandwidth phase locked loop (PLL), wherein in an initial 19 KHz stereo pilot acquisition mode the PLL has a wide bandwidth to make acquisition, or pilot locking, feasible and in a subsequent locked mode the bandwidth automatically changes to a low sub-audible bandwidth to achieve greater stability in the presence of interference and noise. This dual band PLL generates a much more stable 57 KHz signal by locking on the 19 KHz stereo pilot signal and generating the 57 KHz data-demodulation reference signal using the third harmonic of the 19 KHz pilot. In an FM stereo radio receiver that serves also as a radio data receiver, this phase locked loop may simultaneously be used as the stereo decoder for producing the left-plus-right and left-minus-right audio signals.

Furthermore the radio data receiver of this invention eliminates the need for the prior art high performance and expensive filter having a bandpass centered about the suppressed data-signal carrier of 57 KHz. Although in the preferred embodiments described herein of this invention, a simple single pole high pass filter is used instead, the receiver of this invention operates with greater stability and reliability even without this simple filter.

DESCRIPTION OF PREFERRED EMBODIMENTS

Figure 1:
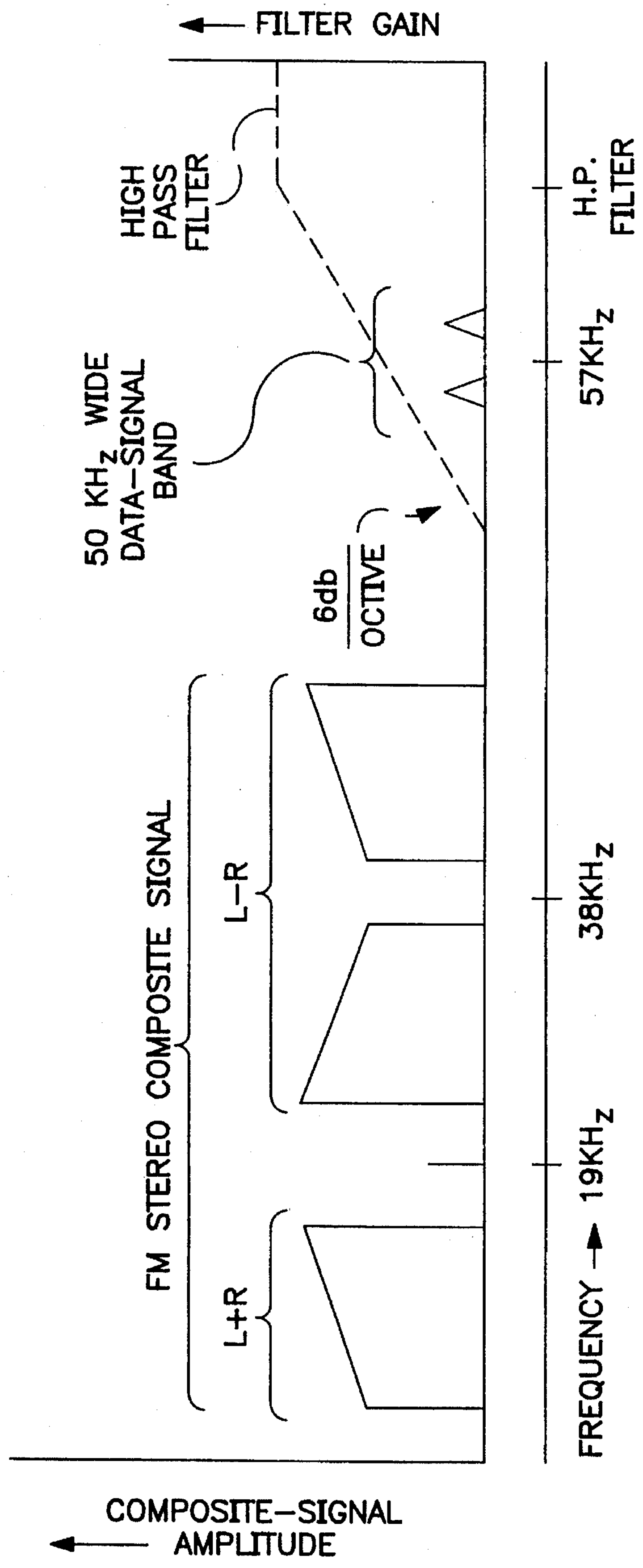
FIG. 1 shows the frequency spectrum of a standard composite FM-radio stereo signal plus a 57 KHz+/−2 KHz radio data band having a suppressed 57 KHz carrier.
Figure 3:
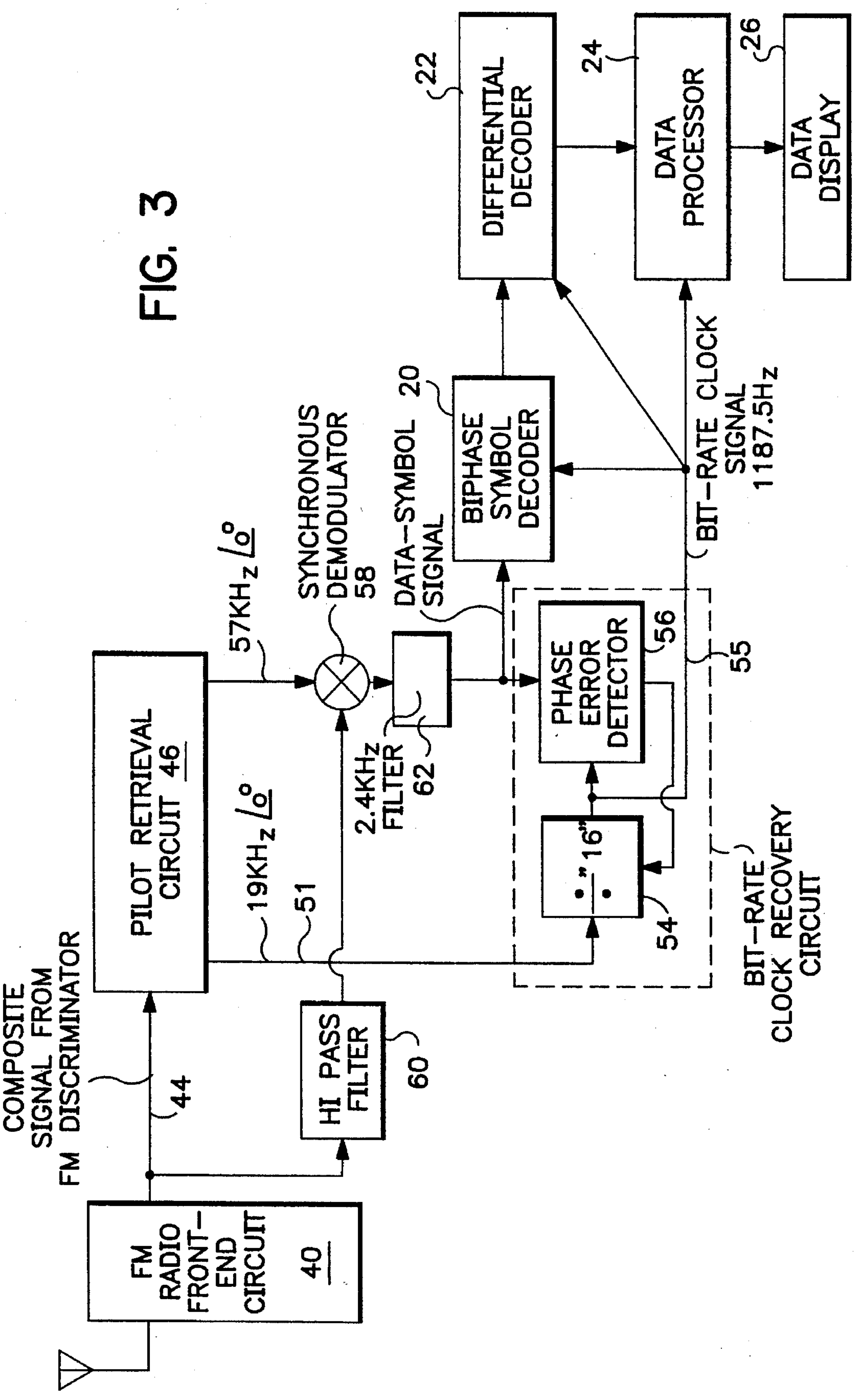
FIG. 3 shows a block diagram of a portion of a radio data system receiver of this invention having radio digital-data reception capability, that complies with the above noted European and United States standards.

Referring to the FM stereo radio and radio-data receiver depicted in FIG. 3, the composite multiplex-stereo and digital-data signal shown in FIG. 1 is produced by the receiver's front end circuits 40 at the input conductor 44 of the pilot-signal retrieval circuit 46. Circuit 46 selectively retrieves the stereo pilot signal and generates a relatively noise free 19 KHz signal of zero phase with respect to the pilot signal at one output 51, and generates a strong stable 57 KHz signal of frequency that is exactly three times that of the 19 KHz pilot signal at another output 52, and of zero phase with respect to the pilot signal, i.e. the third harmonic of the pilot signal. In the pilot retrieval circuit 46 of FIG. 3, the in-phase 19 KHz signal is divided down by sixteen (16) in the counter circuit 54 producing a 1187.5 Hz signal at one input of phase error detector 56. This is the reconstituted bit-rate signal that is also applied to conductor 55.

The in-phase 57 KHz signal from the pilot retrieval circuit 46 is connected to an input of the mixer, or synchronous demodulator, 58. The composite multiplex-stereo and digital-data signal at conductor 44, after passing through the high pass filter 60 that attenuates the stereo band portion of the composite signal, is introduced at the other input of the synchronous demodulator 58. The roll-off characteristic at 6 db per octave of filter 60, curve 61, is positioned at the data band in the composite signal shown in FIG. 1, so that the phases of the two sidebands of the data signal are similarly affected at the filter output. The pole of the high pass filter 60 is thus positioned above the data band at approximately 70 Hz.

On the other hand, the simple single pole filter 60 is not required for stable operation in the presence of noise and interference as is the bandpass filter 30 of the prior art circuit. Use of the simple filter 60 is preferred however, because it reduces the 20 db difference in the level between the stereo band and the relatively low amplitude data band portions of the composite signal as transmitted. Thus the dynamic range of the circuitry handling the data signals is protected by this simple filter 60 from being exceeded by high amplitude stereo-band signals that may cause one or more transistors in the analog signal-data handling circuits to saturate.

The output of the demodulator 58 is connected to the input of a low pass filter 62 having a 2.4 KHz bandwidth. Filter 62 may be identical to the low pass filter 19 employed in the prior art circuit of FIG. 2, being intended to pass only the demodulated digital data-symbol signal, i.e. the data-symbol signal that is generated at the output of the demodulator 58.

The digital data-symbol signal from filter 62 is applied to the other input of phase error detector 56 which detects the existence of a phase difference between the bit rate clock signal generated at the output of divider 54 and the data-symbol signal from the filter 62, and produces an output voltage of a polarity corresponding to the polarity of the detected phase difference.

That phase difference causes the phase error detector 56 to produce a feed back signal to a control input of the frequency divider 54 causing it to momentarily miscount by 15 or 17, as needed, to cause the two input signals of the phase error detector 56 to become in phase with respect to each other. This sampling and miscounting is repeated until phase synchronization is accomplished. Thus the phase error detector 56 combined with the frequency divider 54 serves as a bit-rate clock recovery circuit.

The mutually in-phase data-symbol signal and bit rate clock signal are now in proper condition for introduction to the biphase symbol decoder 20, the differential decoder 22, the data processor 24 and the data display 26.

Figure 4:
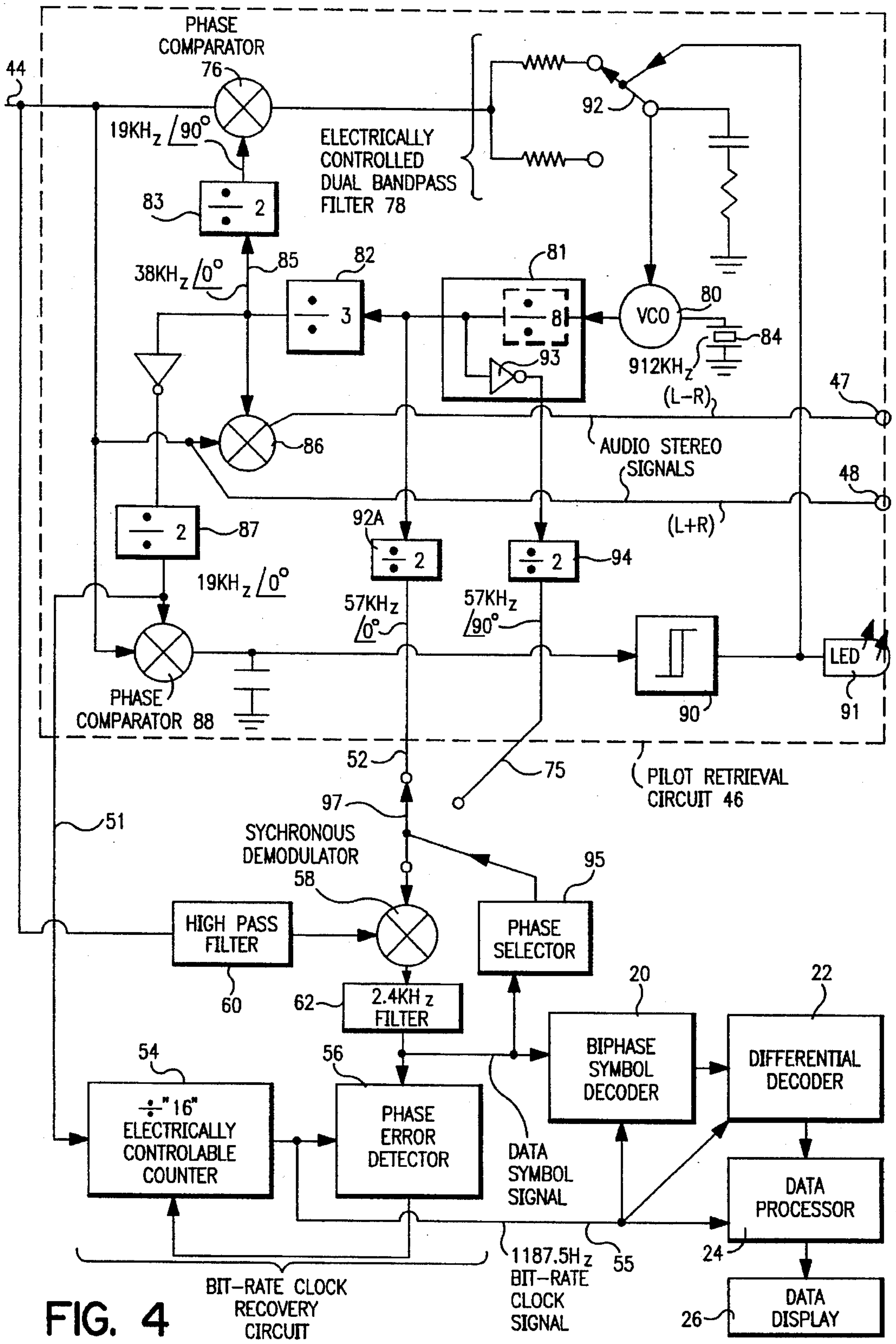
FIG. 4 shows a block diagram of an FM stereo radio receiver combined with an FM data system receiver of this invention.

Referring to FIG. 4, a pilot-signal retrieval circuit 46 includes a phased locked loop (PLL), that locks onto the 19 KHz pilot in the composite stereo signal and also serves to decode the stereo signal producing at outputs 47 and 48 the left and right stereo sound signals. The same numerals assigned to elements in FIG. 3 are assigned to the corresponding elements in FIG. 4. At output 75 of the retrieval circuit 46, there is produced a 57 KHz signal that is out of phase by 90 degrees with the in-phase 57 KHz signal at output 52. The potential use of this added PLL output signal is discussed later herein.

The PLL stereo decoder in the pilot retrieval circuit 46 is a variable bandpass PLL of the kind that is described in my U.S. Pat. No. 5,202,924, issued Apr. 18, 1993 and assigned to the same assignee as is the present invention. The stereo decoder portion of pilot retrieval circuit 46 is made up of a phase comparator 76, an electrically-switchable dual-bandwidth low pass filter 78, an electrically or voltage controlled oscillator (VCO) 80, a divide-by-eight frequency divider 81, a divide-by-three frequency divider 82, and a divide-by-two frequency divider 83. The VCO 80 produces a 912 KHz output signal, the frequency of the resonator 84. The input conductor 44 is connected to the input of phase comparator 76. The VCO 80, when locked to the 19 KHz pilot of the composite stereo signal appearing at the input conductor 44, will produce at conductor 85 a 38 KHz signal that is in-phase with the pilot, e.g. having zero crossings coinciding with those of the incoming 19 KHz pilot.

A double balanced gating circuit 86, employed as a synchronous demodulator has one input connected to the output of the divide-by-three counter 82, and another input connected to the input conductor 44. There is consequently produced a L-R audio signal at conductor 47. The L+R audio signal portion of the composite signal is available at conductor 48. These two signals are appropriately applied via amplifiers (not shown) to the left and right stereo speakers (not shown).

The composite signal from conductor 44 and the output of the divide-by-two divider 87 are fed into a phase comparator 88 to produce an output voltage having an amplitude that is inversely proportional to the magnitude of phase difference between the 19 KHz pilot and the 19 KHz signal from the divide-by-two divider 87. When the output voltage from the phase comparator 88 exceeds the predetermined threshold of Schmitt trigger circuit 90, the LED 91 is turned on indicating that the PLL of the stereo decoder 46 is locked on an FM stereo radio signal pilot. At the time of locking, the electrically controlled switch 92 changes the bandpass of the filter 78 from about 300 Hz to a sub-audible 10 Hz so that the PLL lock on the pilot of the incoming signal becomes more reliably held in the presence of interference and noise signals.

One output of the divide-by eight circuit 81 is connected to a divide-by-two circuit 92 to produce at conductor 52 a strong stable 57 KHz signal at zero phase relative to the pilot signal. The divide-by-eight circuit 81 also includes an inverter 93 that is connected between the divide-by-eight one output and the input of another divide-by-two circuit 94 to produce at conductor 75 a strong stable 57 KHz signal at 90 degrees relative to the pilot signal.

It will now be appreciated that, instead of recovering the suppressed 57 KHz carrier from the data sidebands as in the prior art, the pilot retrieval circuit 46 generates at conductor 52 a more robust 57 KHz signal, of exactly three times the frequency of the strong 19 KHz stereo pilot signal, for demodulating the data band signal and for subsequent use in the data-symbol decoding circuits.

The reliability of data symbol retrieval is further improved as a result of recovering the bit-rate clock signal with reference to the strong 19 KHz signal produced by the pilot retrieval circuit 46, rather than from the data-band portion of the composite signal as in the prior art.

In the composite signal that is transmitted in accordance with the above-mentioned national standards, the data in encoded in such a way, namely using Manchester code, that each binary one and a binary zero together become a biphase data symbol, namely each biphase symbol has a first portion and a last portion composed, respectively, of 57 KHz carrier of one particular phase and a 57 Khz carrier 180 degrees away from the particular phase.

Therefore, in the receiver of the prior art, it is preferred to use a Costas phase locked loop data demodulator because the Costas PLL is uniquely oblivious to which of the two phases of the 57 KHz signal it is demodulating. Thus, no provision need be made in a prior art receiver using a Costas loop demodulator 12, such as in FIG. 2, to determine which of those two phases to use for effecting demodulation of the data signal.

Figure 2:
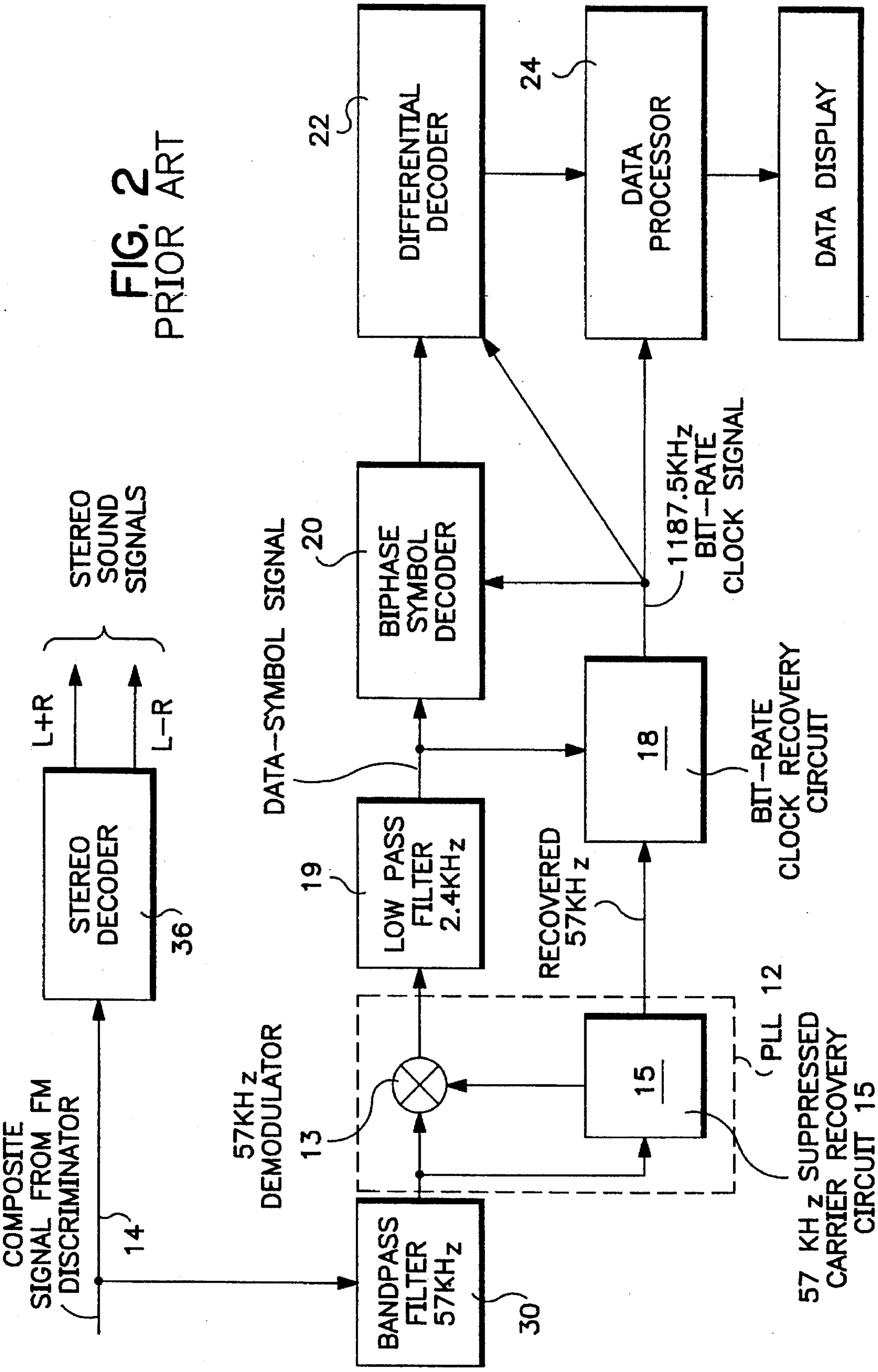
FIG. 2 PRIOR ART
FIG. 2 shows a block diagram of a portion of an FM stereo radio receiver of the prior art having radio digital-data reception capability, according to the European and United States standards.

Any circuit that is used for retrieving the 19 KHz pilot signal in an FM data system receiver of this invention, will produce a 19 KHz (retrieved) pilot signal that must be frequency divided by 16 for use in retrieving the bit-rate clock signal. Therefore, there is one chance in 16 that the divider (54) will begin counting at the occurrence of a rising zero crossing of the 19 KHz (and thus at a rising zero crossing of the "suppressed" 57 KHz data signal carrier in the transmitter), which is the desired phase. A bit-rate recovery circuit, that is the combination of phase error detector 56 and divider 54 in FIGS. 3 and 4, must be provided to sample and recognize which of the possible 16 phase, between the bit-rate clock signal and data-symbol signal portion of the composite signal, is the correct one. The bit-rate recovery circuit 18 in FIG. 2 is shown more generally and is essentially equivalent, except in that circuit the frequency divider must divide the 57 KHz recovered data carrier by 48 so that there are 48 possible phase differences from which one correct one must be chosen. The radio data system receiver of FIG. 3 is compatible with the U.S. standard but not with the European standard.

It is of course desirable that a data system receiver be comparable with both standards. Therefore, consideration must also be given to the fact that in the composite signal which is transmitted in accordance with the European standard, there exists a phase ambiguity of 0 and 90 degrees between the 57 KHz suppressed carrier and the 19 KHz pilot signals. This quadrature ambiguity is of no consequence in the prior art circuit of FIG. 2 because both the suppressed 57 KHz carrier and the data-symbol signal are reconstructed from the data band signal in the composite signal wherein both have the correct relative phases.

But in a receiver of this invention, the data-symbol signal is derived from the composite signal, i.e. the 57 KHz carrier used for demodulation of the data signal is obtained from the 19 KHz stereo pilot signal frequency-multiplied by three creating a quadrature ambiguity that may be accommodated as follows.

The radio data system receiver of FIG. 4 is compatible with both the U.S. and European standards, wherein there is additionally provided a quadrature phased 57 KHz signal from the PLL counters 81, 77 and 79, a phase selector circuit 95, and an electrically controllable switch 97 to choose which of the two 57 KHz signals, e.g. from conductor 52 or 75, is the proper one to use for demodulating the data band signal.

The phase selector circuit 95, during a brief time interval, flips the switch 97 back and forth and compares the data-symbol signals obtained from the output of the filter 62 that is demodulated in turn by the in-phase and the two quadrature phase 57 KHz signals. The phase selector 95 detects which of the two 57 KHz data-carrier signals produces the largest amplitude data-symbol signal, which method is essentially equivalent to choosing the phase that causes the bit symbols to be in phase with the bit clock in the output of the 2.4 KHz filter 62. A timer in the phase selector 95 may be used to establish a brief testing period, e.g. 0.1 seconds, during which comparing and choosing may be accomplished. The switch 97 is thereafter held fixed to the chosen 57 KHz signal conductor 52 or 75.

I claim:

1. An FM radio data-system receiver having a radio-receiver front-end circuit means for receiving an FM broadcast signal modulated by an audio and digital-data signal, and for producing at a composite-signal output conductor, a composite signal including a pilot signal and a AM dual side band digital-data signal with a suppressed carrier, wherein the improvement comprises:

a) a pilot-signal retrieval circuit means having an input connected to said composite-signal conductor, for generating at a first data-carrier output a first stable signal of frequency that is an exact multiple of the pilot signal frequency and corresponds to the frequency of the suppressed carrier, said first stable signal having a fixed phase relationship with the pilot signal;

b) a demodulator means, connected to said pilot-signal retrieval circuit means and connected to said composite-signal conductor, for recovering and producing at a demodulator output, with respect to said first stable signal, the data-symbol signal from the data-signal portion of the composite signal; and c) a bit-rate clock recovery circuit means connected to said pilot-signal retrieval means, and connected to said demodulator output, for re-generating the bit-rate clock signal from the data-signal portion of the composite signal.

2. The radio data system receiver of claim 1, additionally comprising a single-pole high pass filter wherein the pole is at a frequency that is greater than those of the data band in the composite signal, said high pass filter connected between said composite signal conductor and a data-signal input of said demodulator-means to effect the connection therebetween.

3. The radio data system receiver of claim 1, additionally comprising a high pass filter having a rising gain characteristic centered at about the frequency of the suppressed carrier, said high pass filter connected between said composite signal conductor and a data-signal input of said demodulator-means to effect the connection therebetween.

4. The radio data system receiver of claim 1, additionally comprising a low pass filter connected between said demodulator output and a data-symbol input of said bit-rate clock recovery circuit means to effect the connection therebetween.

5. The radio data system receiver of claim 1, additionally comprising a symbol decoder means connected to said demodulator output and to the output of said bit-rate clock recovery circuit means, for decoding said data-symbol signal with reference to the bit-rate clock signal and for displaying the data.

6. The radio data-system receiver of claim 1 wherein said pilot-signal retrieval circuit means is additionally for generating at a second data-carrier output a second stable signal of frequency that is an exact multiple of the pilot signal and that corresponds to the frequency of the suppressed carrier, said second stable signal being out of phase with respect to said first stable signal by 90 degrees; and said receiver additionally comprising:

a) an electrically controllable double-throw switch means, connected to a data-symbol input of said bit-rate clock recovery circuit means, having a switch pole connected to said data-carrier input of said demodulator means, and having two switch contacts connected respectively to said first and second data-carrier outputs of said pilot retrieval means, said switch means being for, during a brief testing interval, alternately connecting said switch pole to each of said switch contacts and for, at the end of said testing interval, leaving said switch pole switched to the one of said switch contacts for which the data-symbol signal of greatest amplitude is produced at said data-symbol input of said bit-rate recovery circuit means;

b) a phase selector means having an input connected to said input of said bit-rate recovery circuit means and having an output connected to said switch means for causing said switch means to alternately connect said reference input of said demodulator means to said one and another outputs of said pilot-signal retrieval circuit means, determining for which one of said alternate switch connections the magnitude of the data-symbol signal is greatest, and locking said switch means to that one connection.

7. An FM radio data-system receiver comprising:

a) a radio-receiver front-end circuit means for receiving a FM broadcast signal modulated by an audio and digital-data signal and for producing at a front-end output a composite signal including a 19 KHz pilot signal and a dual-side-band AM-modulated digital data signal with a suppressed 57 KHz carrier;

b) a pilot-signal retrieval circuit means, connected to said front-end circuit means, for selectively retrieving the pilot signal and for generating at first and second outputs, respectively, a relatively noise-free 19 KHz signal and a stable 57 KHz signal both of which are in phase with said pilot signal;

c) a 57 KHz demodulator means having a modulated-signal input connected to said front end output, and having a reference input connected to said second output of said pilot-signal retrieval circuit means, for recovering the data-symbol signal from the composite signal;

d) a divider and phase-error detector means connected to the output of said demodulator means and to said first output of said pilot-signal retrieval circuit means, for frequency dividing the noise-free 19 KHz signal and for recovering and producing the bit-rate clock signal from the data-band portion of the composite signal.

8. The FM radio data-system receiver of claim 7 wherein said receiver is a stereo radio and a radio data-system receiver and wherein said pilot-signal retrieval circuit means is a phase locked loop (PLL) means that is additionally for locking onto the 19 KHz pilot signal, for decoding the stereo signal and for producing at a L–R and a L+R outputs the left-minus-right and left-plus-right stereo audio signals, so that said PLL means serves both as a source of a stable data-signal carrier signal and also as a stereo decoder.

9. The radio data system receiver of claim 8 wherein said phase locked loop is a dual-bandwidth phase locked loop (PLL) including an electrically controllable dual-bandwidth filter means for providing a wide loop bandwidth for acquiring a lock on said 19 KHz pilot signal and for providing a narrow sub-audio PLL bandwidth after acquiring and locking on to said 19 KHz pilot signal.

10. An FM radio data-system receiver having a radio-receiver front-end circuit means for receiving an FM broadcast audio plus digital-data signal, and for producing at a composite-signal output conductor a composite signal including an audio pilot signal and a dual-side-band digital data signal with a suppressed carrier, wherein the improvement comprises:

a) a pilot-signal retrieval circuit means having an input connected to said composite-signal conductor, for generating at a pilot output a relatively noise free pilot signal that is of the same frequency as, and in phase with, the pilot-signal part of said composite signal, and for generating at a first data-carrier output a first stable signal of frequency that is an exact multiple of the pilot signal and corresponds to the frequency of the suppressed carrier, said first stable signal having a fixed phase relationship with the noise free pilot signal;

b) a demodulator means having a data-carrier input connected to said first data-carrier output of said pilot-signal retrieval circuit means, and having a data-signal input connected to said composite signal conductor, for recovering and producing at a demodulator output the data-symbol signal from the data-signal portion of the composite signal; and c) a bit-rate clock recovery circuit means having a pilot-reference input connected to the pilot output of said pilot-signal retrieval means, and having a data-symbol input connected to said demodulator output, for re-generating the bit-rate clock signal from the data-signal portion of the composite signal.

* * * * *